(12) United States Patent
Koh et al.

(10) Patent No.: US 10,209,536 B2
(45) Date of Patent: Feb. 19, 2019

(54) METHOD FOR CORRECTING A WEARER BEHAVIOUR FOR USING A PAIR OF SPECTACLES IN OPTIMIZED CONDITIONS

(71) Applicant: ESSILOR INTERNATIONAL (COMPAGNIE GENERALE D'OPTIQUE), Charenton-le-Pont (FR)

(72) Inventors: Patricia Koh, Charenton-le-Pont (FR); Thierry Bonnin, Charenton-le-Pont (FR); Bastien Feret, Charenton-le-Pont (FR); Ahmed Haddadi, Charenton-le-Pont (FR); Damien Paille, Charenton-le-Pont (FR); Soazic Mousset, Charenton-le-Pont (FR)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 0 days.

(21) Appl. No.: 15/032,009

(22) PCT Filed: Oct. 23, 2014

(86) PCT No.: PCT/IB2014/002610
§ 371 (c)(1),
(2) Date: Apr. 25, 2016

(87) PCT Pub. No.: WO2015/059566
PCT Pub. Date: Apr. 30, 2015

(65) Prior Publication Data
US 2016/0291349 A1 Oct. 6, 2016

(30) Foreign Application Priority Data
Oct. 25, 2013 (EP) .................................... 13306476

(51) Int. Cl.
*G02C 11/00* (2006.01)
*G02C 7/02* (2006.01)

(52) U.S. Cl.
CPC ................ *G02C 11/10* (2013.01); *G02C 7/02* (2013.01); *G02C 2202/24* (2013.01)

(58) Field of Classification Search
CPC .. A61B 3/032; A61B 3/10; A61B 3/11; A61B 3/113; A61F 9/00; G02C 7/02;
(Continued)

(56) References Cited

U.S. PATENT DOCUMENTS 3,993,407 A * 11/1976 Moricca ................. A61H 3/061
250/222.1
5,257,198 A * 10/1993 van Schoyck ....... G02C 13/003
340/4.36

(Continued)

FOREIGN PATENT DOCUMENTS

CN 2370437 3/2000
EP 1087252 3/2001
(Continued)

OTHER PUBLICATIONS

International Search Report and Written Opinion issued in PCT/IB2014/002610, dated.

*Primary Examiner* — Quan-Zhen Wang
*Assistant Examiner* — Stephen R Burgdorf
(74) *Attorney, Agent, or Firm* — Norton Rose Fulbright US LLP (57) ABSTRACT

The invention relates to a method (20) for correcting an individual behavior for using a pair of spectacles in optimized conditions, said individual wearing frame (4). According to the invention said method comprises the following steps: —a step (24) of determining parameters that characterize the behavioral conditions of the individual using correcting means securely fastened to the frame of the frame (4) in the preceding various situations for a set time; —a step (26) of comparing said parameters with preset reference values; and —a step (28) of correcting the behav-
(Continued)

ior of the individual using detecting means (1) that are securely fastened to the said frame (4), and that trigger when the difference between a parameter and the corresponding reference value diverges beyond a preset threshold value.

18 Claims, 6 Drawing Sheets

(58) Field of Classification Search
CPC .......... G02C 7/027; G02C 7/06; G02C 7/061; G02C 7/08; G02C 11/10; G02C 13/00; G02C 13/005; G02C 2202/24
USPC ...................................................... 340/573.1
See application file for complete search history.

(56) References Cited

U.S. PATENT DOCUMENTS

| | | | | | |
|---|---|---|---|---|---|
| 5,982,286 | A | * | 11/1999 | Vanmoor | ................ G01S 15/04 340/573.4 |
| 6,212,427 | B1 | * | 4/2001 | Hoover | ................ A61B 5/0006 600/515 |
| 6,325,508 | B1 | * | 12/2001 | Decreton | ................ G02C 7/02 351/158 |
| 9,450,961 | B2 | * | 9/2016 | Stanasolovich | ......... H04L 63/10 |
| 2007/0229761 | A1 | * | 10/2007 | Gimenez Carol | ..... A61B 3/113 351/209 |
| 2008/0106697 | A1 | * | 5/2008 | Pedrono | ................. G02C 7/061 351/159.42 |
| 2008/0266119 | A1 | * | 10/2008 | Mannik | .................. G08B 21/06 340/575 |
| 2010/0177186 | A1 | * | 7/2010 | Baranton | ............. G02C 13/005 348/78 |
| 2011/0292345 | A1 | * | 12/2011 | Haddadi | .............. G02C 13/003 351/239 |
| 2012/0268713 | A1 | * | 10/2012 | Guilloux | ................ G02C 7/066 351/159.77 |
| 2012/0320333 | A1 | * | 12/2012 | Holden | .................. G02C 7/041 351/159.05 |
| 2013/0222137 | A1 | * | 8/2013 | Alameh | ............ H04M 1/72569 340/573.1 |

FOREIGN PATENT DOCUMENTS

| | | | | |
|---|---|---|---|---|
| EP | | 1181912 A1 * | 2/2002 | ............... G02C 1/00 |
| WO | WO 2008/078320 | | 7/2008 | |
| WO | WO 2009/024681 | | 2/2009 | |
| WO | WO 2012/036638 | | 3/2012 | |

* cited by examiner

Fig. 8

METHOD FOR CORRECTING A WEARER BEHAVIOUR FOR USING A PAIR OF SPECTACLES IN OPTIMIZED CONDITIONS

CROSS-REFERENCE TO RELATED APPLICATIONS

This application is a national phase application under 35 U.S.C. § 371 of International Application No. PCT/IB2014/002610 filed 23 Oct. 2014, which claims priority to European Patent Application No. 13306476.6 filed 25 Oct. 2013. The entire contents of each of the abovereferenced disclosures is specifically incorporated by reference herein without disclaimer.

The invention relates to a method for correcting wearer behaviour for using a pair of spectacles in optimized conditions. This is because, even if the spectacles are perfectly dimensioned to correct a visual defect of the wearer, the fact, for example, of their sitting too close to a computer screen and/or reading under low-luminosity conditions, may act to increase said visual defect. It is therefore particularly important to adopt a good behaviour during a reading and/or writing activity and to seek to obtain favourable luminosity conditions in order to avoid aggravating a visual defect. It is noted that the term "progression" includes two notions which are "start" and "apparition".

A method according to the invention aims to detect the risk that a spectacles wearer will see their visual defect progress due to their behaviour, for example during reading and/or writing phases, or with the luminance conditions, then to correct their behaviour during said phases, in order to prevent degradation of said visual defect.

Typically, the visual defect may, for example, consist of child myopia.

The subject of the invention is a method for correcting an individual behaviour for using a pair of spectacles in optimized conditions, said individual wearing spectacles. According to the invention, said method comprises the following steps:
  a step of determining parameters that characterize the behavioural conditions of the individual using correcting means securely fastened to the frame of the spectacles in the preceding various situations for a set time;
  a step of comparing said parameters with preset reference values; and
  a step of correcting the behaviour of the individual using detecting means (1) that are securely fastened to the said frame (4), and that trigger when the difference between a parameter and the corresponding reference value diverges beyond a preset threshold value.

This behaviour may take a variety of forms and may, for example, correspond to behaviour during phases of writing, reading, viewing a screen or observing an object at a given distance.

Spectacles refer to a frame equipped with two lenses which may have or not an optical power. In this way, an emmetropic individual may wear spectacles with non corrected lenses.

The step of determining various parameters allows the poor visual behaviour to be characterized in behavioural terms and/or in terms of reading distance. Such parameters may, for example, correspond to a distance between the eyes of the individual and the object to be viewed, and an inclination of the frame. This determining step may, for example, consist of a measuring step carried out using technical means such as an inclinometer securely fastened to the frame, a clip-type pinpointing means with markers added to said frame, an image-acquiring system, an image-processing system, etc.

If in contrast, it is observed that the individual adopts a satisfactory behaviour during the various activities requiring them to concentrate their eyes, the method then stops at this stage.

Once these parameters have been determined, they are then compared to reference values corresponding to good reading and/or viewing behaviour. These reference values are generally available in the published literature and often depend on the age the individual. This is because visual defects such as myopia, for example, progress differently in children and in adults.

The last step aims to correct the bad reading and/or viewing habits of the individual during their customary activities, by virtue of detecting means securely fastened to the frame, which means are adjusted depending on the results of the comparison carried out in the preceding step. For example, if the eyes of the individual are too far from a computer screen relative to an "ideal" reference value available in the literature, the detecting means react by emitting, for example, an audible or visual signal inviting the individual to move closer to said screen. Preferably, each detecting means comprise a means for measuring a parameter in real-time, and a warning means that triggers depending on an associated reference value.

A method according to the invention helps an individual gradually to adopt good reading behaviour during the various activities they repeat every day, in order to prevent the apparition of or to stop the progression of their visual defect.

Advantageously, a method according to the invention comprises a step of evaluating the behavioural profile of the individual in various situations in which the spectacles is used for a given period of time. This step consists, for example, in measuring the duration of time spent by the individual in front of a computer screen or spent writing and/or reading, and in measuring the illumination and/or luminosity conditions during these various phases. It is also important to evaluate the frequency of these activities and their duration.

Advantageously, a method according to the invention comprises a step of adjusting the threshold values depending at least on the values of the determined parameters. Specifically, at the start of the method, the threshold value will deliberately be modified to lie near the determined parameter in order to decrease the frequency with which the detecting means triggers. Once the individual has started to correct their behaviour, this threshold value is then gradually modified in order to tend towards its initial value in order to progress said behaviour-correcting process. In this way, the behaviour of the individual is gradually modified, without the individual becoming unmotivated by the detecting means triggering too frequently.

Preferably, the step of correcting the behaviour is made by iterative steps, the threshold values being modified at each of said steps in order to progressively correct said behaviour.

Advantageously, each iterative step is predetermined and is based on the behavioural profile of the individual.

Preferably iterative steps are defined automatically by the correcting means based on the number of detected alerts.

Preferably, the step of evaluating behavioural profile is carried out on the basis of quantities including the age of the individual, the duration of the phases of activity requiring closed work, and that said individual carries out in the period of time in question, and the illuminance conditions during said phases. The phases of activity requiring closed work may, for example, correspond to phases of reading or writing, or to phases of observing a particular object such as a television. These quantities thus make it possible to detect the risk of said individual aggravating their visual defect.

Preferably, the step of evaluating behavioural profile comprises a step of comparing each quantity relating to the behaviour of the individual with a standard quantity corresponding to a preset behaviour. By way of example, a grade of 0 may be attributed to a given quantity if the behaviour is satisfactory or a grade of 1 if it is unsatisfactory. The grades thus obtained for each quantity are added, and it is the final score that is taken into consideration when evaluating whether the behavioural profile of the individual is liable or not to aggravate their visual defect.

Advantageously, the behavioural conditions are defined by at least two parameters chosen from a working distance, an ambient illuminance level, duration spent reading, duration spent writing, and an inclination angle of the frame. Generally, the closed distance is the distance separating the eyes of the individual or spectacles from the object that is to be observed for a given duration.

Advantageously, the correcting step is preceded by a parameter-recording step. This is because, in order to be able to carry out the correcting step, it is necessary to be able to access the measurements obtained so that they may subsequently be used, for example at an optometrist or opticians, especially in order to set the reference values.

Preferably, the parameters are transmitted to another writable or remote medium by conventional telecommunication means. The writable medium may for example be a USB key. The conventional telecommunication means may, for example, include the Internet, and in this case the results are assembled into the form of files that are then transmitted via e-mail.

Preferably, the parameter-determining step is carried out by correcting means, which are specific means for measuring the luminance of a working plane, the ambient illuminance, the working distance, and the inclination of the frame, said means being securely fastened to the frame, the individual wearing them behaving naturally while carrying out their habitual activities. It is noted that the correcting means are not corresponding to correcting glasses. The expression "securely fastened" is understood to mean added to the frame by means, for example, of a clip or more generally a removable holder, or incorporated directly into the frame.

Advantageously, the measuring means comprise an inclinometer for evaluating the inclination angle of the frame.

Advantageously, the measuring means comprise two emitters and a receiver for evaluating the working distance, said receiver being arranged on the frame in order to receive the signal emitted by at least one emitter and reflected by a working plane. The working distance may for example correspond to a reading distance at which a book is read or a screen is viewed, or to a writing distance.

Preferably, the measuring means comprise an element for measuring the luminance of a working plane and/or the ambient illuminance. The working plane may, for example, consist of the surface of a computer screen, the surface of a paper page, or the surface of a television screen.

Preferably, the preset reference values are taken from available tables and/or depend on the age, height and/or the "Harmon" distance of the wearer. The "Harmon" distance is a parameter corresponding to a closed working distance.

Advantageously, the frame is equipped with two corrective lenses to form spectacles.

Advantageously, a method according to the invention comprises an initial step of checking the conformity of the spectacles with respect to the visual defect of the individual. This is because, if the spectacles are not correctly dimensioned to correct the visual defect of the individual, a slowing down method according to the invention will no longer be of any benefit because all the steps that it implements will be biased.

Preferably, the working distance is chosen from a reading distance, an observing distance, and a writing distance.

Advantageously, the detecting means comprises a measuring means and a warning means. Specifically, the measuring means allows a parameter such as, for example, the inclination of the frame or the working distance, to be measured in real-time, the warning means being coupled to the measuring means so that it triggers as soon as the value of the measured parameter diverges from a preset threshold value.

Preferably, the measuring means of the detecting means is identical to that used in the parameter-determining step.

Advantageously, the warning means is chosen from an audible warning means, a visual warning means and a software-based indicator. The aforementioned means are easy to implement, effective, and compact.

Advantageously, the step of determining the profile and the step of the determining the initial parameters are carried out with a frame equipped with sensors. Thus, the sensors allow all the parameters relating to the behavioural profile of the individual, and all the parameters characterizing the behaviour of the individual, to be reconstructed with precision.

Preferably, spectacles with two lenses having not any optical power may be wear by an emmetropic individual as a preventing mean to prevent the deterioration of vision.

Correcting methods according to the invention have the advantage of suggesting corrections to the behaviour of the individual during an activity requiring closed work, which corrections are based on the actual everyday attitudes and habits of the individual during said phases, thereby giving these corrections credibility. In addition these methods have the advantage of appearing unconstraining to the individual, insofar as they do not require an artificial reconstruction of the reading and/or observing conditions of said individual.

A detailed description of a preferred embodiment of a correcting method according to the invention is given below with reference to FIGS. 1 to 8.

Figure 1:
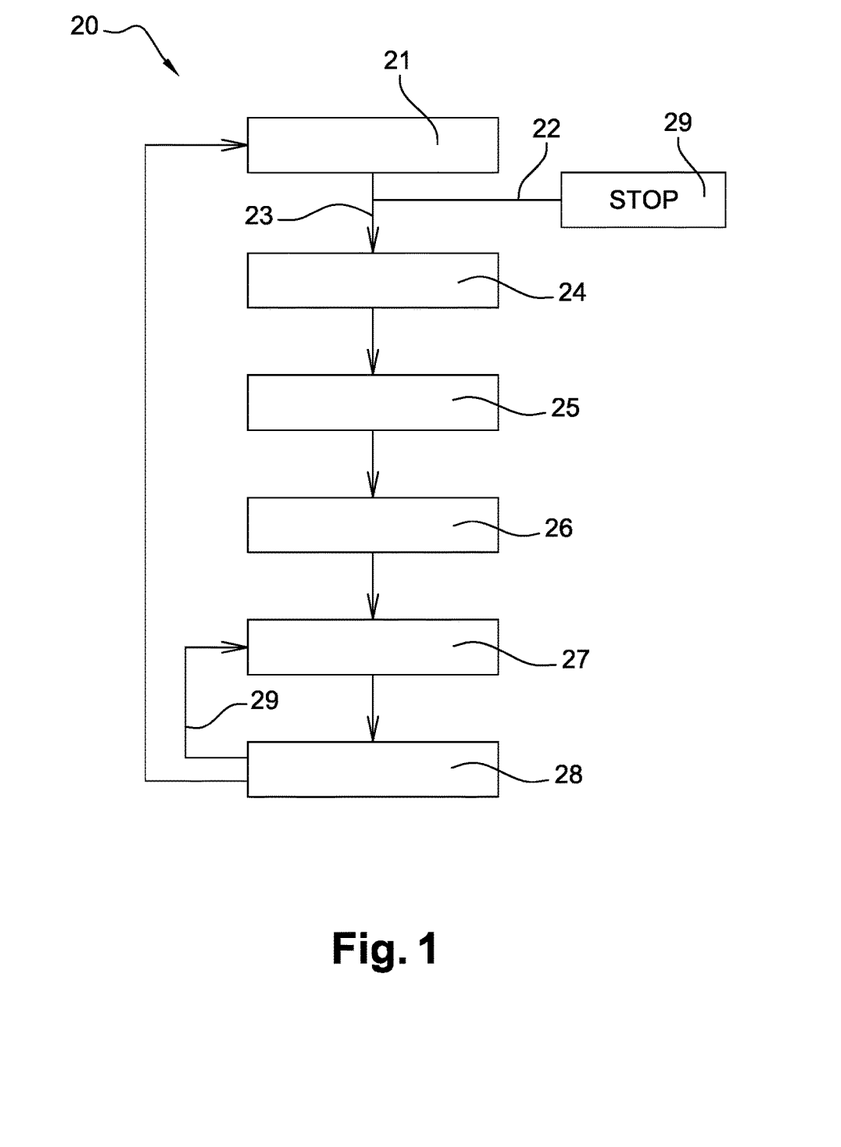
FIG. 1 is a flowchart showing the various steps of a behaviour-correcting method according to the invention.

With reference to FIG. 1, a method 20 for correcting an individual behaviour for using a pair of spectacles in optimized conditions comprises the following steps:
- an initial step of checking the conformity of the spectacles with respect to the visual defect of the individual;
- a step 21 of evaluating the behavioural profile of the individual in various situations in which the spectacles is used for a given period of time;
- a step of determining 24 parameters that characterize the behavioural conditions of the individual using correcting means securely fastened to the frame in the preceding various situations for a set time;
- a parameter-recording step 25;
- a step 26 of comparing said parameters with preset reference values;
- a step 27 of adjusting the reference values depending on the measured parameters; and
- a step 28 of correcting the behaviour of the individual using detecting means that are securely fastened to the frame, and that trigger when the difference between a parameter and the corresponding reference value diverges beyond a preset threshold value.

Each of the aforementioned steps will be described in detail with reference to the corresponding figures. In order to illustrate an example of a method pursuant to the invention the progression of the visual defect of an individual according to the invention, it is assumed in the rest of the description that the individual is a child and that the visual defect to be corrected is myopia.

The initial step of checking the spectacles is indispensable in the context of a method according to the invention. This is because, if it is assumed that the lenses of the spectacles do not satisfactorily correct the myopia of the child, this child will inevitably adopt bad behaviours during their various phases of activity, especially in order to compensate for these unsuitable lenses. Since these behaviours are artificial, the method according to the invention no longer has any attraction and can no longer be applied.

This initial step is followed by a step 21 of evaluating the behavioural profile of the child in various situations in which the spectacles are used for a given period of time. The aim of this step is to determine the principal activities that the child carries out in, for example, one day or one week, and then to determine the conditions under which the child carries them out. Another aim of this step is to determine the light conditions during these activities and between them. These repeated activities may be split into three main categories:
- a reading activity during which the child reads a text, either on a paper medium or on a computer, tablet or mobile-phone screen;
- a writing activity during which they write text on a paper medium; and
- an activity in which some sort of object is observed, the object possibly, for example, being a television set located a few meters in front of the eyes of the child.

The light conditions can be determined by measurements carried out at regular intervals such as every 5 minutes.

For these activities, this step must allow the ambient illuminance conditions and the duration of these activities to be determined, and any other characteristics allowing the conditions under which said activities are carried out to be evaluated. This step may, for example, take the form of a spoken or written questionnaire that an optician may ask the child to take. For example, for each of the aforementioned quantities, a value of 1 may be assigned by the optician if the reported behaviour seems bad, and of 0 if the behaviour seems good. All these grades are then added together, and it is the final score that is taken into consideration when establishing whether or not the behavioural profile of the child presents a danger to their myopia.

This step therefore has two outcomes:
- either the behavioural profile of the child during their various activities is satisfactory 22 and the method stops 29 at this stage because it may be assumed that the risk of the child aggravating their myopia during said activities is virtually zero,
- or the behavioural profile of the child is judged to be unsatisfactory 23 because there is a risk of them aggravating their myopia during these various activities and, in this case, the method according to the invention continues with a step 24 of determining parameters characterizing the behaviour of the child, using a correcting means securely fastened to the frame in the various preceding situations, for a given period of time.

This parameter-determining step 24 may for example be carried out with various correcting means securely fastened to the frame. These correcting means may either be directly incorporated into the frame in the form of a 3D sensor, or be held by a marker-equipped pinpointing clip that is fixed to said frame. These correcting means may for example consist of specific means for measuring the luminance of the working plane, the ambient illuminance, the working distance, and the inclination of the frame, the child behaving naturally while carrying out their habitual activities. These measuring means may advantageously be complemented with a image-acquiring system, such as for example a high-definition camera and/or camcorder, the acquired images of which can be processed in order to obtain parameters such as, for example, a reading or writing distance, and an inclination of the frame. The working distance which corresponds to closed work, may consist either of a reading distance, or of a writing distance, or of an observing distance at which a particular object is observed. During this step, the child, equipped with various measuring means, carries out their habitual activities in a natural way without changing any of their habits in terms of behaviour. These parameters are acquired over a given time, possibly ranging, for example, from a few minutes to several hours.

The aim of this parameter-determining step 24 is to determine in concrete terms the conditions under which the child carries out these activities involving substantial closed work, said parameters forming the starting point of the process for correcting the behaviour of the child.

Once these parameters have been determined, they are then recorded 25, either onto a medium such as a USB key, or as files in order to be transmitted, via a network such as the Internet, to a remote location. In this way, the measured parameters may, for example, be communicated to an optician and/or to the parents of the child, to assess the kid progresses.

Figure 2:
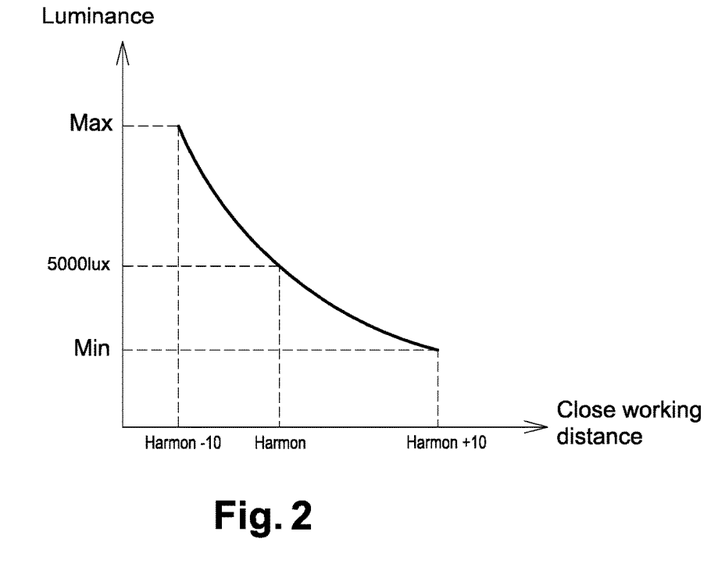
FIG. 2 is a prior-art reference graph illustrating the correlation between luminance and working distance for good visual behaviour.

The method according to the invention then implements a step 26 of comparing the parameters determined during the various activities of the child with reference values for these parameters corresponding to good behaviour, especially behaviour making it possible to prevent the myopia of the child from progressing. These reference values exist in the published literature, and are the result of specific studies carried out by specialists in the fields of ergonomics and vision. By way of illustration of this available literature, FIG. 2 shows an example of luminance reference values as a function of close working distance reference values. The close working distance reference values can be described by using "Harmon" distance. This distance is measured by placing a closed fist under the chin and resting the elbow on a table. The point at the end of the elbow represents the closest distance a person should be from their near work. It corresponds to the optimal visual distance for reading and other close work. This type of curve firstly allows the working distance of the child during one of their favourite activities requiring closed work to be input, and secondly makes it possible to ascertain how to correct the behaviour of the child and/or the luminance conditions in order to meet the expected point in the curve by getting closer to the curve target.

If significant differences are detected between the value of the parameters determined for the child and the reference values, a method according to the invention implements a step 28 of correcting the behaviour of the child using detecting means that are securely fastened to the frame, and that trigger when the difference between a measured parameter and the corresponding reference value diverges beyond a preset threshold value. During this correcting step 28, the child wears spectacles comprising a frame that is equipped with glasses for correcting their myopia and with detecting means, each of which means has two components, namely:
- a means for measuring the corresponding parameter, such as the closed working distance, the inclination of the frame, and the luminance of a working plane, in real-time; and
- a warning means connected to said measuring means, which measuring means triggers instantaneously once the difference between the value of said measured parameter and a preset reference value exceeds a threshold value.

In order to make the correcting process according to the invention a gradual process, the step 28 of correcting the behaviour of the child is preceded by a step 27 of adjusting the reference values depending on the value of the measured parameters. Specifically, at the start of the correcting method each reference value will deliberately be modified in order to lie near the corresponding measured parameter, in order to decrease the triggering frequency of the detecting means. Once the individual has satisfactorily corrected their behaviour relative to this offset reference value, this reference value is again adjusted 29 and gradually tends towards its initial value as the process of correcting said behaviour progresses. In this way, the individual learns to gradually modify their behaviour without being demotivated by the detecting means triggering too frequently.

The detecting means 1 employed during the correcting step 28 incorporates measuring means that may be identical to those used during the parameter-determining step 24. Details of these detecting means 1 are given below.

Figure 3:
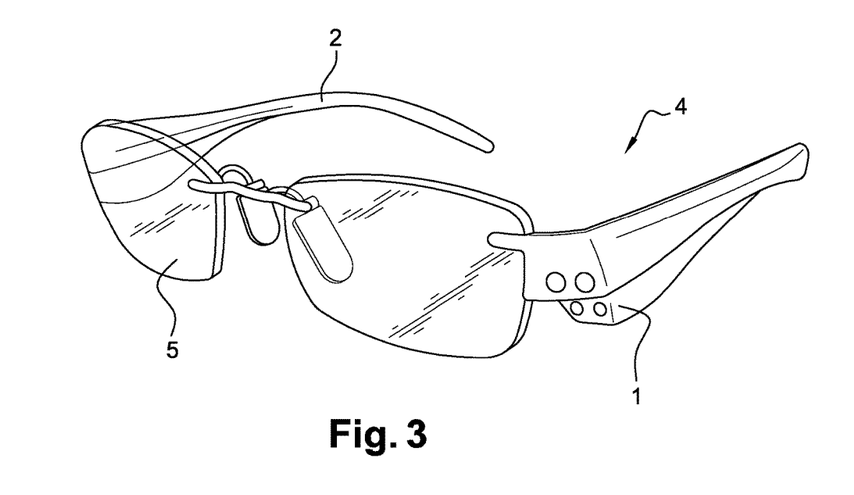
FIG. 3 shows, by way of example, a frame one temple of which is equipped with detecting means able to correct the behaviour of an individual.

With reference to FIG. 3, the spectacles 4 comprises a frame with two temples 2 and two myopia-correcting glasses 5, one temple 2 being equipped with means 1 for detecting said difference. It will be noted that these detecting means 1 may also be placed on top of the eye wires of the frame 4 encircling the glasses 5, or even on the bridge of the frame 4.

Figure 4:
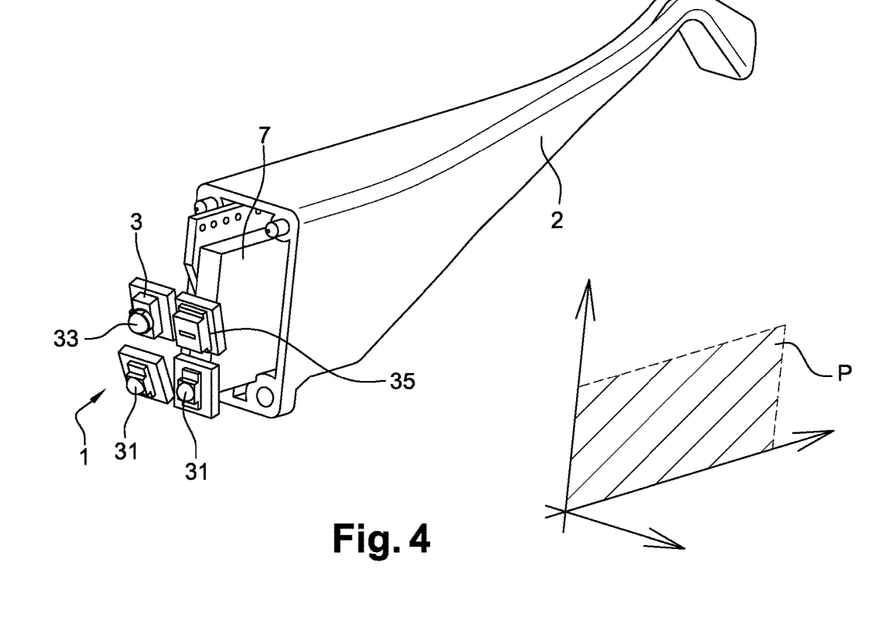
FIG. 4 shows a frame temple equipped with particular detecting means.
Figure 5A:
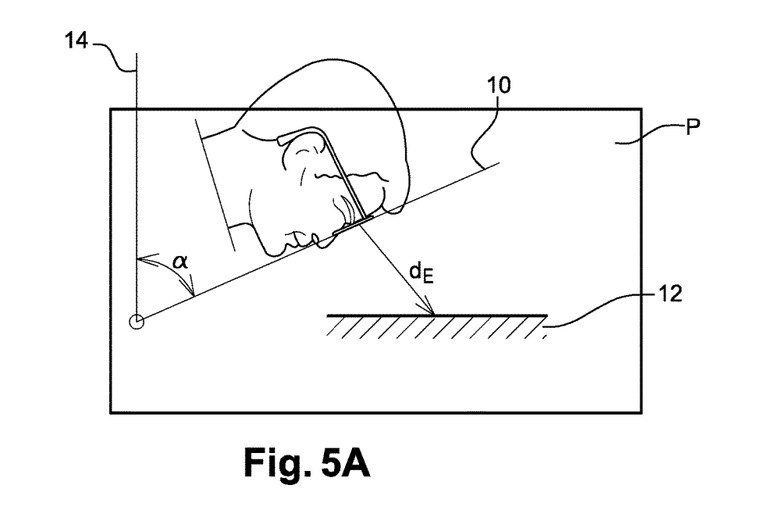
FIG. 5A is a side view illustrating a spectacle wearer in writing mode.
Figure 5B:
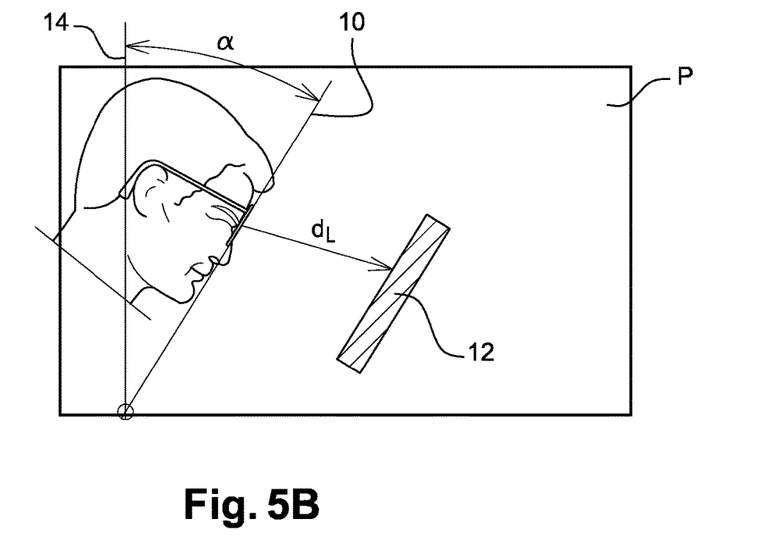
FIG. 5B is a side view illustrating a spectacle wearer in reading mode.
Figure 6:
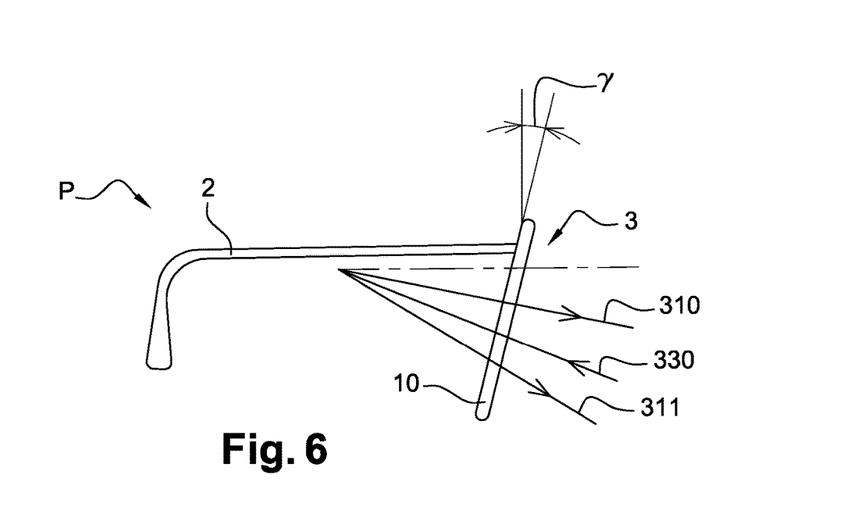
FIG. 6 is a schematic side view showing an example angular arrangement of a means for measuring the working distance.

With reference to FIG. 4, the detecting means 1 comprise means 3 for measuring the distance between a mean plane 10 of the two glasses of the frame, as shown in FIG. 6, or a mean plane of the two eye wires of the frame 4, and a working plane 12, as illustrated in FIGS. 5A and 5B, said measuring means 3 also being called range-finding means 3. The working plane 12 is a plane in which a book, a document or a screen is located from/to which the spectacle wearer is reading/writing. The working plane 12 may consist of a reading plane, such as a book or a notepad held in the hands of the spectacle wearer. The working plane 12 may also consist of a writing plane, such as a table on which a notepad is placed. The reading plane and the writing plane may be identical or different.

The distance-measuring means 3 comprise two emitters 31 and a receiver 33 arranged in order to be able to receive the signal emitted by at least one of the two emitters 31 and reflected by the working plane 12. The range-finding means 3 may comprise, for example, two infrared-emitting diodes and an infrared-sensitive sensor. The emitting diodes 31 may emit with a certain radiation cone, and the sensor 33 may have a certain detection cone.

In the embodiment in FIG. 4, the detecting means 1 allowing behaviour to be corrected furthermore comprise a means 35 for measuring a luminance value of the reading or writing plane. The means 35 for measuring a luminance value of the working plane may consist, for example, of a photodiode having a sensitivity to visible light similar to that of the human eye. The relationship between the illuminance E and luminance L for a Lambertian surface of reflectance p is written $E = L \times \rho \times 2\Pi$.

Furthermore, the detecting means 1 comprise a battery 7 for supplying electrical power to the various components of said detecting means. The battery may be rechargeable, for example by means of a micro-USB cable.

The embodiment in FIG. 4, which comprises two emitters 31 and a receiver 33, is advantageous because the detection of the reflected signal is particularly precise and robust. This is because the sensors are placed in a configuration that is convergent on the working plane 12. Their position and orientation are adjustable depending on the morphology of the face and/or on the shape of the frame. The plane P is the median vertical plane of the head of the individual. This plane is orthogonal to the facial plane.

The detecting means 1 allowing the behaviour of the child to be corrected also comprise a warning means (not shown). According to possible features, this warning means may comprise a visual alarm, such as a light-emitting diode, which will possibly blink on and off, an audible alarm, a vibration generator, or a combination of a plurality of these means. These warning means may also consist in sending a message to an operator possibly for example a parent or an optician. The visual alarm may be visible to the child or to another person, implying that the visual alarm may be arranged on the interior or on the exterior of the frame 4. The visual alarm, which has the advantage of being discreet, may easily be used by a spectacle-wearing child in a classroom.

The detecting means 1 allowing the behaviour of the child to be corrected may also comprise a means (not shown) for measuring an inclination angle of the mean plane 10 of the two glasses or of the two eye wires of the frame in the vertical plane P. According to a preferred embodiment of the invention, the means for measuring the inclination angle comprises an inclinometer and/or an accelerometer. This measuring means thus allows angles to the horizontal, and especially the inclination angle of the head of the person, to be measured.

The inclination angle $\alpha$ and the vertical plane P are illustrated in FIGS. 5A and 5B. The vertical plane P corresponds to the plane of the figure. The inclination angle $\alpha$ is measured between the vertical 14 and the plane 10 of the glasses of the frame 4. The inclination angle $\alpha$ thus corresponds to an angle of inclination of the head of the child wearing the frame 4. The inclination angle $\alpha$ may, for example, lie in a range between 30° and 80°, and is preferably about 70° when the child is looking at a horizontal reading or writing plane 12 as illustrated in FIG. 5A. When the child is looking at an inclined reading plane 12 such as a book held in their hands, the inclination angle α of the head may, for example, lie in a range between 0° and 45°, and is preferably about 35°.

The detecting means 1 may also comprise a controlling means (not shown) able to distinguish between a reading mode and a writing mode. The controlling means makes this distinction using a threshold inclination angle value. The controlling means determines whether the inclination angle α is larger than a preset inclination-angle setpoint. If this is the case, and if the inclination angle α is smaller than the threshold inclination angle, the controlling means determines that the spectacle wearer is in reading mode. If the inclination angle α is larger than the threshold inclination angle, the controlling means determines that the spectacle wearer is in writing mode.

Preferably, depending on whether the controlling means determines that the wearer is in reading or writing mode, only one of the two sensors 31 to the given mode is selected.

The controlling means may, for example, comprise a microprocessor. The reading mode is associated with a reading distance setpoint, and the writing mode is associated with a writing distance setpoint. The values of the reading distance setpoint and the writing distance setpoint may be identical or different. For example, the reading and writing distance setpoints may be about 40 cm. Alternatively, the value of the reading distance setpoint may be greater than the value of the writing distance setpoint.

FIGS. 5A and 5B illustrate writing and reading modes, respectively. The threshold inclination angle of the plane 10 of the glasses may be, for example, about 20° to the vertical 14. In this example, if the inclination angle is smaller than 20°, the person is in writing mode, which corresponds to behaviour suitable for writing on a horizontal working plane. If the inclination angle is larger than 20°, the person is in reading mode.

The warning means is triggered by a controlling means when the measured distance in reading mode is smaller than the reading distance setpoint, and/or when the measured distance in writing mode is smaller than the writing distance setpoint. Thus, when the distance to the working plane is too small for near vision, the spectacle-wearing child is warned by the warning means triggering, and they are then invited to move further away from the working plane by modifying their behaviour, in order to stop the warning means.

In one embodiment, the luminance-measuring means 35 is coupled to the warning means, which is then triggered by the controlling means when the measured luminance value is lower than a luminance value setpoint that depends on the reading or writing distance, respectively. For example, the luminance value setpoint may be higher if the distance to the working plane is smaller, and lower is the distance to the working plane is larger. The warning means can still be triggered if the distance setpoint, which depends on the mode in which the person is in, is respected.

FIG. 6 shows a side view of an example angular arrangement of the means 3 for measuring distance, with respect to the plane 10 of the glasses or eyewires of the frame 4. In this example, the distance-measuring means 3 are arranged so that their principal emitting or receiving orientation axes form an angle of between 0° and 20° with a straight line orthogonal to the mean plane 10 of the two glasses 10 or of the two eye wires of the frame 4, in the vertical plane P corresponding to the plane of figure. The principal axis 310 of the first emitting diode is oriented perpendicularly to the plane 10 of the glasses or of the eye wires of the frame 4, corresponding to an angle of 0°. The principal axis 310 of the first diode coincides with the straight line orthogonal to the mean plane 10 of the two glasses or the two eye wires of the frame 4. The principal orientation axis 311 of the second emitting diode is oriented at 20° to the principal axis 310 of the first emitting diode. The receiving diode is arranged so that its principal axis 330 is orientated at 10° to the principal axis 310, intermediate between the emission directions of the emitting diodes.

With reference to FIG. 6, the plane 10 of the glasses is typically arranged with a pantoscopic angle γ of about 10° to the vertical 14, thereby making it possible for the gaze line of the person to lie perpendicular to the plane of the glasses.

In a preferred embodiment, the detecting means 1 comprise two sets of means 3 for measuring reading and/or writing distance. For example, each temple 2 of the frame 4 may be equipped with two emitting diodes and a sensor such as described above.

Figure 7:
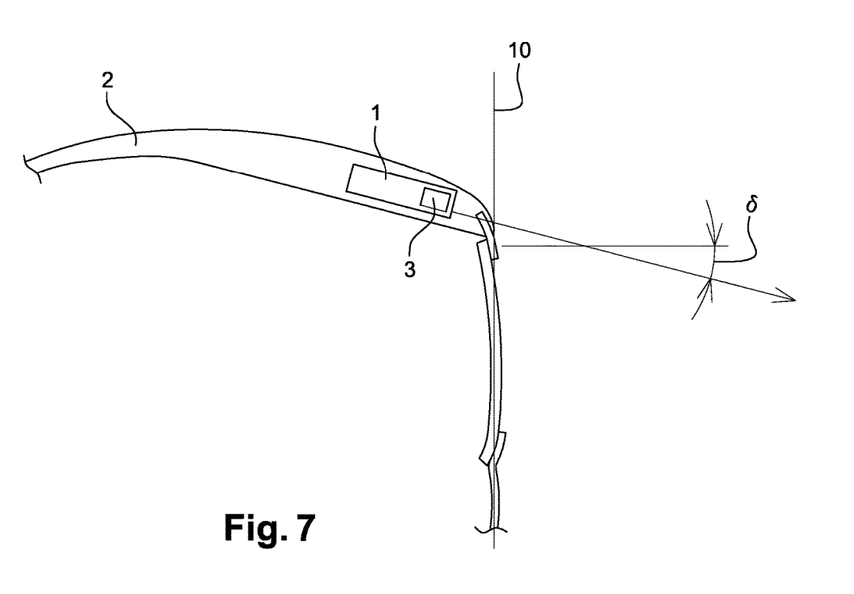
FIG. 7 is a top view showing an example arrangement of a set of distance-measuring means of detecting means with respect to the plane of the glasses of a frame.

With reference to FIG. 7, the set of distance-measuring means 3 may be arranged with a horizontal tilt angle δ between −45° and 0°, and preferably equal to −30°, in order to converge on the nasal zone with respect to a straight line orthogonal to the mean plane 10 of the two glasses or two eye wires of the frame 4.

The horizontal tilt angle of the sensors can be adjusted depending on the shape and/or morphology of the child Advantageously, the detecting means 1 furthermore comprise communicating means (not shown) for the purposes of communication with an external recording and/or displaying device (not shown). The detecting means 1 may also comprise recording means (not shown) for recording the measured reading and/or writing distances, the measured luminance value and/or the number of times the warning means have been triggered. The recording means may consist, for example, of a memory card.

Preferably, parameters such as the values of the reading and/or writing distance setpoints, the threshold inclination-angle value and/or the luminance value setpoint can be personalized. For example, the optician or ophthalmologist may adjust one or more of these values by means of a computer connected to the detecting means 1 by a micro-USB cable or a Bluetooth connection. Is then possible to take account of the fact that each spectacle wearing person adopts a behaviour that is indeed unique to them when carrying out near-vision work.

The detecting means 1 may be fitted on or integrated into one of the temples 2 of the frame 4 of the spectacles. For example, said means 1 may be removably or durably fixed to one of the temples 2 of the frame 4. The detecting means may also be integrated into one of the temples 2 of the frame 4, as illustrated in FIG. 2. As described above, it is also possible to equip each of the two temples 2 of the frame 4 with the detecting means 1.

Advantageously, the detecting means 1 are fitted to the temple 2 of the frame 4 on the opposite side to the writing hand of the spectacle wearer. Thus, correct operation of said means 1 is not adversely affected by the writing hand of the wearer and the reading and/or writing distances may be correctly measured.

The detecting means 1 allowing the behaviour of the child to be corrected have the advantages of being compact, light and inexpensive. In addition, working-plane distances can be measured with a precision of about one centimeter, even at large incidence angles. The detecting means 1 are also able to satisfy the constraints placed on them by the behaviours of right-handed and left-handed wearers.

Figure 8:
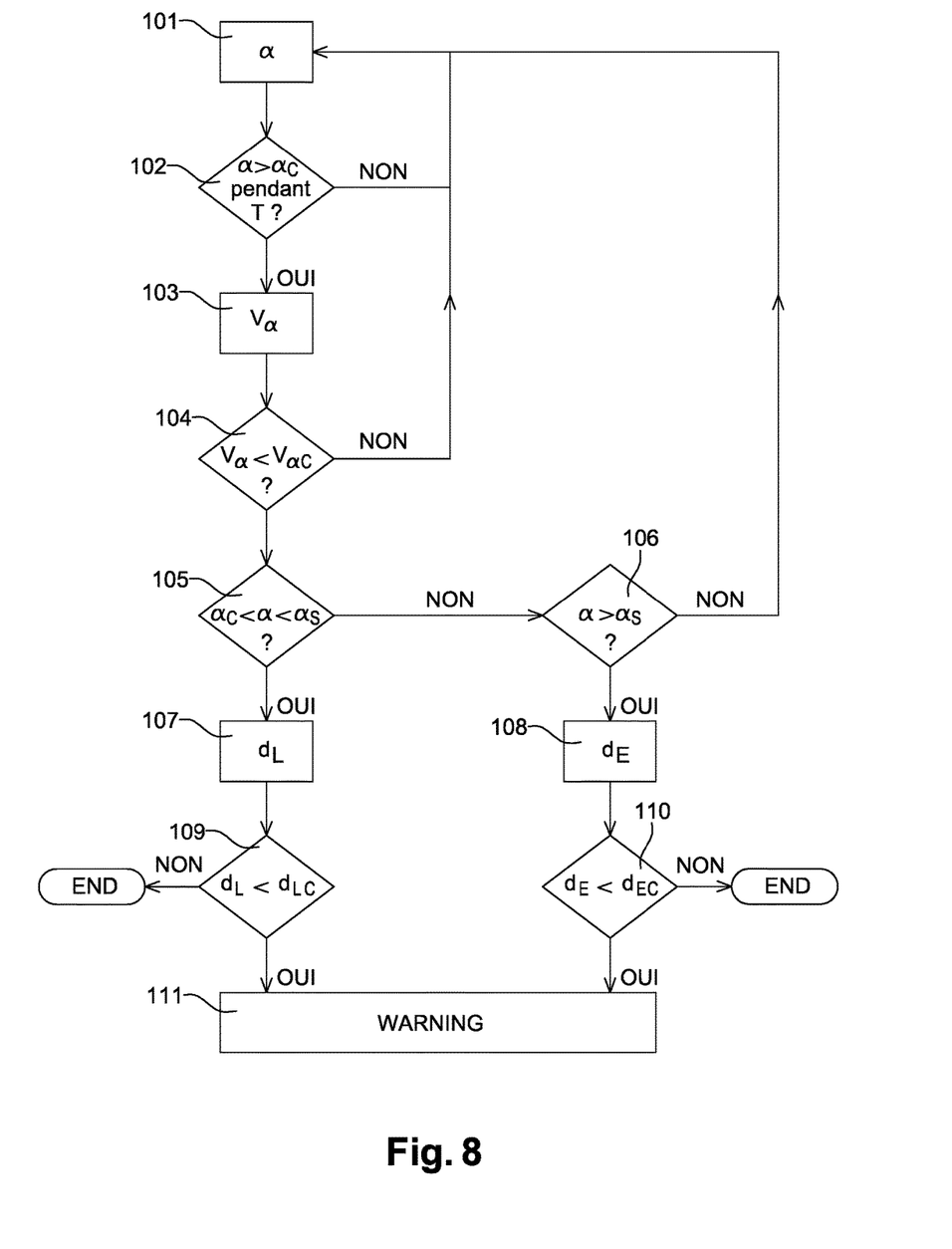
FIG. 8 is a flowchart showing the principal phases of the behaviour-correcting step of a method according to the invention.

With reference to FIG. 8, the various phases of the step of correcting the behaviour of a spectacle-wearing child follow the following order:

The inclination angle α of the mean plane of the two glasses or of the two eye wires of the frame 4 is measured (step 101). It is determined (step 102) whether the inclination angle α is larger than an inclination-angle setpoint $α_c$ for a preset length of time T. The inclination-angle setpoint $α_c$ may, for example, be about −10° to the vertical. This delay prevents a warning from being triggered when an object briefly passes in front of the frame 4 of the child. For example, the preset length of time T may be about 10 to 30 seconds approximately.

If the inclination angle α is larger than the inclination-angle setpoint $α_c$ for the preset length of time T, a parameter relating to movement of the position and/or orientation of the head is then determined (step 103). This movement may be determined, for example, by an accelerometer or a gyrometer integrated into the frame 4.

Measuring the movement of the head makes it possible to ascertain whether the child is actually in the process of reading or writing. Specifically, if the head of the child moves a lot and/or rapidly it is unlikely that the child is carrying out work involving reading or writing. Thus, distance measurements are carried out only if the spectacle-wearing child is actually in reading or writing mode, in order to allow electrical power resources to be efficiently managed via, for example, the lifetime of the battery.

If the movement of the head is smaller than a threshold movement value, controlling means distinguish between a reading mode and a writing mode depending on the threshold inclination angle $α_s$ (steps 105 and 106). As described above, the reading mode is associated with an inclination angle α smaller than the threshold inclination angle $α_s$ and larger than the inclination-angle setpoint $α_c$, and a reading distance setpoint $d_{LC}$; and the writing mode is associated with an inclination angle α larger than the threshold inclination angle $α_s$, and a writing distance setpoint $d_{EC}$.

If the child is in reading mode, the reading distance $d_L$ is measured between the mean plane of the two glasses and the reading plane (step 107). Similarly, if the child is in writing mode, the writing distance $d_E$ is measured between the plane of the glasses and the writing plane (step 108). If it is determined that the measured distance $d_L$, $d_E$, depending on the mode, is smaller than the reading or writing distance setpoint $d_{LC}$, $d_{EC}$ (steps 109 and 110, respectively), a warning is triggered in order to warn the child that they need to correct their behaviour (step 111).

In one embodiment, the reading mode is associated with an additional reading distance setpoint and the writing mode is associated with an additional writing distance setpoint. The method then furthermore comprises a step in which a warning is triggered when the measured reading/writing distance is smaller than the largest of the reading/writing distance setpoint and the additional reading/writing distance setpoint, respectively. The intensity and/or the frequency of the triggered warning varies proportionally as a function of the reading/writing distance measured between the reading/writing distance setpoint and the additional distance setpoint, respectively. For example, the reading distance setpoint may be 29 cm, and the additional reading distance setpoint may be 24 cm. The alarm is triggered when the measured distance is smaller than 29 cm, and may consist in a discontinuous audible signal of a certain frequency. The frequency of the audible signal increases when the measured distance decreases between 29 cm and 24 cm. When the measured distance is smaller than 24 cm, the audible signal may be continuous.

Preferably, the method according to the invention furthermore involves recording data. The data may comprise the measured reading and/or writing distances, the measured luminance value and/or the number of times warnings have been triggered, and the associated dates and/or times. The recorded data may also be transferred to an external recording and/or displaying device, such as a computer, for example by means of a micro-USB cable or a wireless connection. Thus, the data may be recorded and sent to the computer of the optician or ophthalmologist who is monitoring the spectacle-wearing child.

Alternatively, the data may be sent in real-time to the external recording and/or displaying device.

Thus, the optician or ophthalmologist will be able to monitor the behaviour of the spectacle-wearing child. For example, the number of times or the frequency with which the alarm is triggered may give an indication of whether the child has progressive myopia.

For example, if there are too many alarms it is recommended to visit the optician to control the lenses correction. A message can be sent electronically to parents or optician if there are too many alerts.

The optician or ophthalmologist can also adapt the alarm thresholds in order to better manage behaviour, with respect to the working plane of the child or their optical prescription, depending on the circumstances. Thus, the process of correcting the behaviour of the child will be a gradual process involving a succession of iterations in which the reference values are gradually modified. Thus, at the start of the behaviour-correcting step, these reference values are set arbitrarily near the parameter values measured for the child and then gradually separated from said measured values until they return to their original values, which correspond to a satisfactory behaviour.

The iterative process can be automatically managed by a defined preset program embedded in the frame. For instance we can start with a reference value of 30 cm. Then if no alert is detected during for instance one week, the reference value moves to 32 cm, and so on . . . until the stable position (for instance 40 cm) be reached (the one defined in the Harmon table).

The iterative process can also be manual and selective programs can be defined by the optician for a long term plan. The optician will select predetermined programs corresponding to the behavioural profile evaluated.

This correcting step may be carried out independently of the nature of the reading and/or writing plane. For example, the reading and/or writing plane or medium may consist of a paper medium or a screen of a computer such as a tablet computer. Equivalently, this step is suitable for implementation with any type of working medium.

The method according to the invention may be used for a myopic or hypermetropic child who might be subject to poor near-field working conditions because, for example, of an unsuitable behaviour or insufficient illumination, and to slow progress of their visual defect.

It is important to point out that a method pursuant to the invention is not only applied to a child but to any individual who wants to prevent the apparition or to slow down the progression of a visual defect.

Moreover, the method pursuant to the invention may also be applied to a nearsighted, farsighted, presbyopic or emmetropic individual.

For dedicated use with specific lenses, such as Myopalux, a child tends to look usually at the bottom side of said lenses, when he is reading or writing.

The invention claimed is:

1. A method for correcting an individual behaviour in an individual who will wear a pair of spectacles optimized for the individual comprising:
   placing a frame on the individual;
   determining parameters that characterize the behavioural conditions of the individual using at least one emitter and receiver securely fastened to the frame in various situations for a set time;
   comparing said parameters with preset reference values corresponding to optimal individual behaviour; and
   correcting the behaviour of the individual using the at least one emitter and receiver that are securely fastened to the said frame, and that trigger when the difference between a parameter and the corresponding reference value diverges beyond a preset threshold value,
   the method further comprises adjusting the threshold values depending at least on the values of the determined parameters, the adjusting including:
      at the start of the method, decreasing a triggering frequency by setting the threshold value to an initial value lying near the corresponding determined parameter, and
      iteratively modifying the threshold value to a value progressively closer to the preset reference value for the corresponding determined parameter,
   wherein the at least one emitter and receiver are coupled to at least one processor able to distinguish between a reading mode and a writing mode, using a threshold inclination angle value, the at least one processor determining whether an inclination angle α is larger than a preset inclination-angle setpoint, and in the case where the inclination angle α is smaller than the threshold inclination angle value, the at least one processor determines that the individual is in the reading mode, and in the case where the inclination angle α is larger than the threshold inclination angle value, the at least one processor determines that the individual is in the writing mode.

2. The method of claim 1, further comprising evaluating a behavioural profile of the individual in various situations in which the frame is used for a given period of time.

3. The method of claim 2, wherein evaluating the behavioural profile is carried out on the basis of parameters including the age of the individual, a duration of the phases of activity requiring close work, and that said individual carries out in the period of time in question, and illuminance conditions during said phases.

4. The method of claim 2, wherein evaluating the behavioural profile comprises comparing each quantity relating to the behaviour of the individual with a standard quantity corresponding to a preset behaviour.

5. The method of claim 4, wherein evaluating the behavioural profile further comprises:
   attributing a grade of 0 to a satisfactory behaviour quantity;
   attributing a grade of 1 to an unsatisfactory behaviour quantity;
   determining a final score by adding the grades of each behaviour quantity together; and
   determining, based on the final score, whether the behavioural profile of the individual will aggravate a visual defect of the individual.

6. The method of claim 2, wherein the behavioural conditions are defined by at least two parameters further defined as a working distance, an ambient illuminance level, duration spent reading, duration spent writing, or an inclination angle of the frame.

7. The method of claim 6, wherein one of the parameters is a working distance further defined as a reading distance, an observing distance, or a writing distance.

8. The method of claim 1, wherein correcting the behaviour is made in iterative steps, the threshold values being modified at each of said steps in order to progressively correct said behaviour.

9. The method of claim 8, wherein each iterative step is predetermined and is based on a behavioural profile of the individual.

10. The method of claim 8, wherein the iterative steps are defined automatically by the at least one emitter and receiver based on the number of detected alerts.

11. The method of claim 1, wherein the correcting is preceded by a parameter-recording.

12. The method of claim 11, wherein parameters are transmitted to another writable or remote medium by a network.

13. The method of claim 1, wherein parameter-determining is carried out by the at least one emitter and receiver for measuring the luminance of a working plane, the ambient illuminance, the working distance, and the inclination of the frame, and in that the at least one emitter and receiver are securely fastened to the frame, the individual wearing them behaving naturally while carrying out their habitual activities.

14. The method of claim 1, wherein the preset reference values are taken from available tables and depend on the age, height and/or the "Harmon" distance of the wearer.

15. The method of claim 1, wherein the frame is equipped with two corrective lenses to form spectacles.

16. The method of claim 15, further comprising initially checking the conformity of the spectacles with respect to a visual defect of the individual.

17. The method of claim 1, wherein determining a profile and determining initial parameters are carried out with a sensor-equipped frame.

18. The method of claim 1, further defined as a method of correcting a behaviour in an emmetropic individual employing a frame with two lenses having not any optical power to be worn by the emmetropic individual to prevent deterioration of vision.

* * * * *